Figure 5:
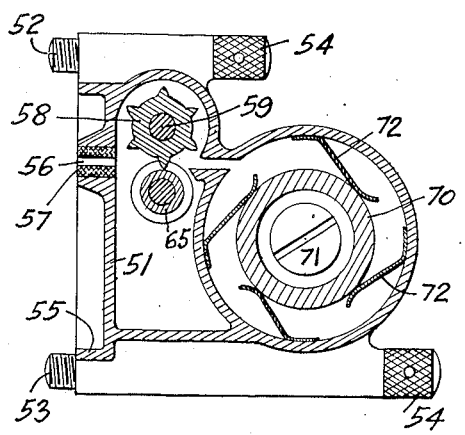
Figure 6:
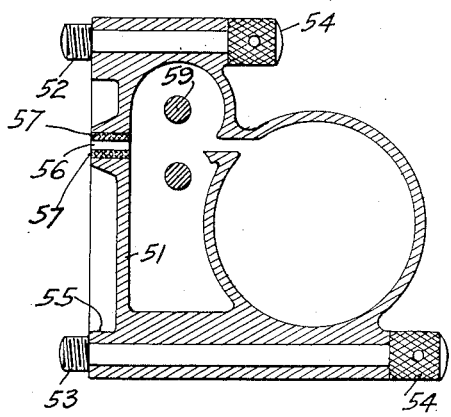

May 3, 1949.  A. SIMMON ET AL  2,469,008
ROLL FILM CAMERA WITH DETACHABLE MAGAZINE
Filed Sept. 28, 1944  6 Sheets-Sheet 1
Fig: 1
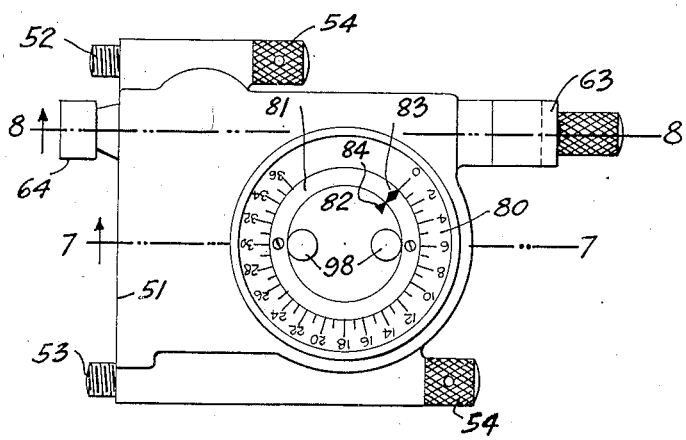
Fig: 2
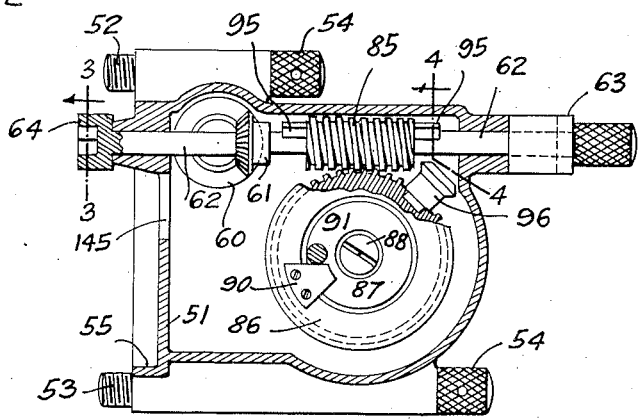
Fig: 3  Fig: 4
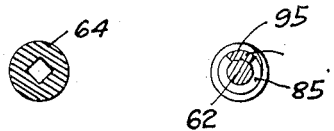
Alfred Simmon
Louis L. Weisglass
INVENTORS
BY Walter E. Wollheim
ATTORNEY.

May 3, 1949.  A. SIMMON ET AL  2,469,008
ROLL FILM CAMERA WITH DETACHABLE MAGAZINE
Filed Sept. 28, 1944  6 Sheets-Sheet 2

Alfred Simmon
Louis L. Weisglass
INVENTORS

BY Walter E. Wallheim
ATTORNEY.

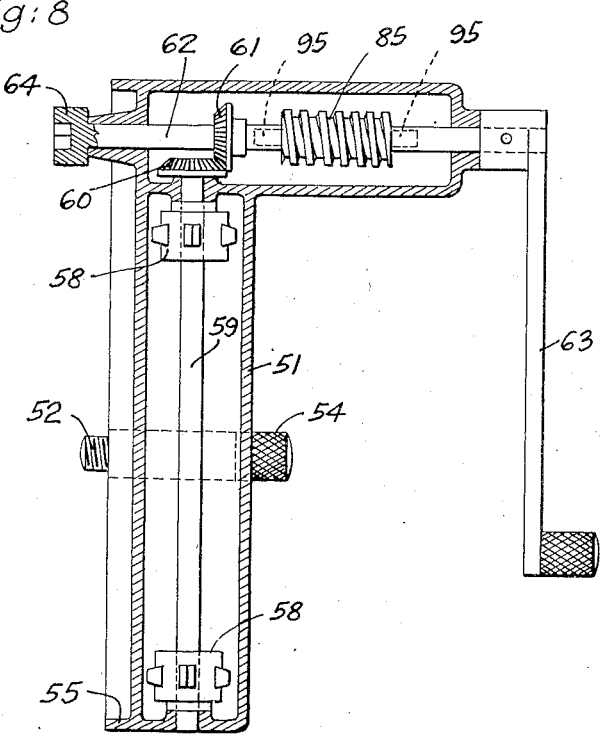

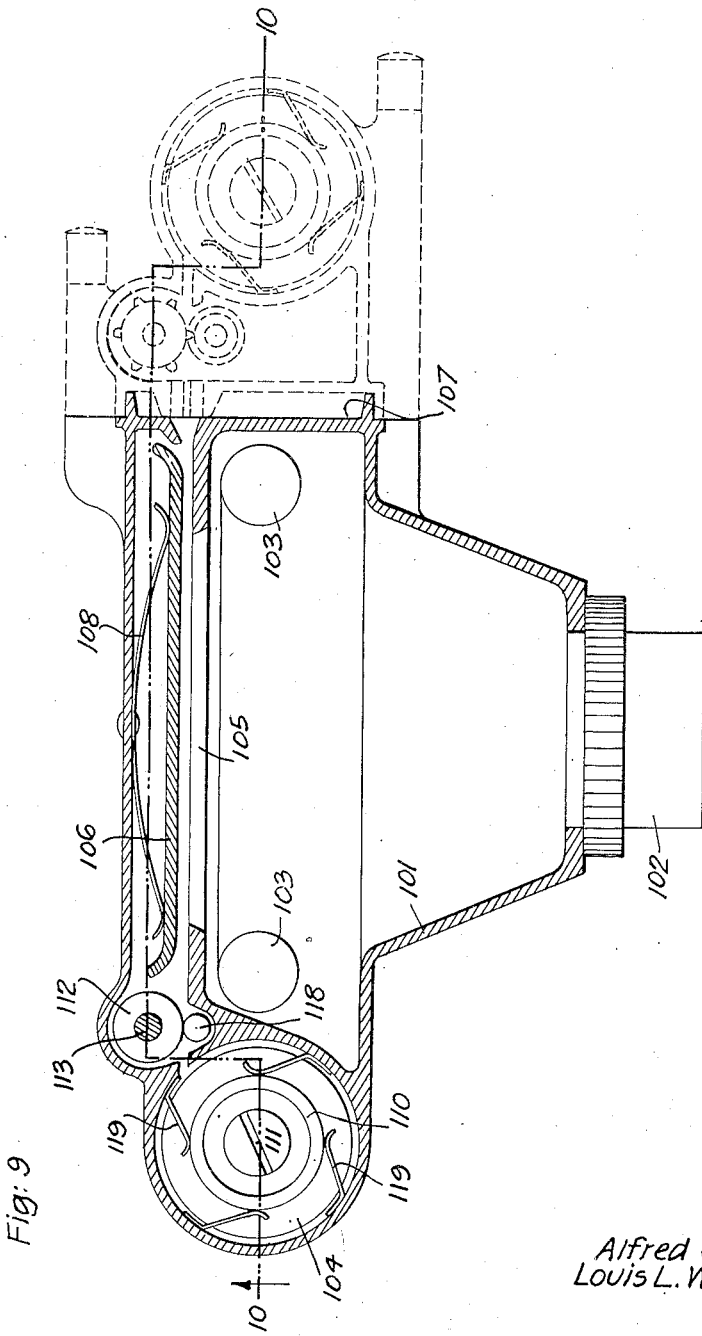

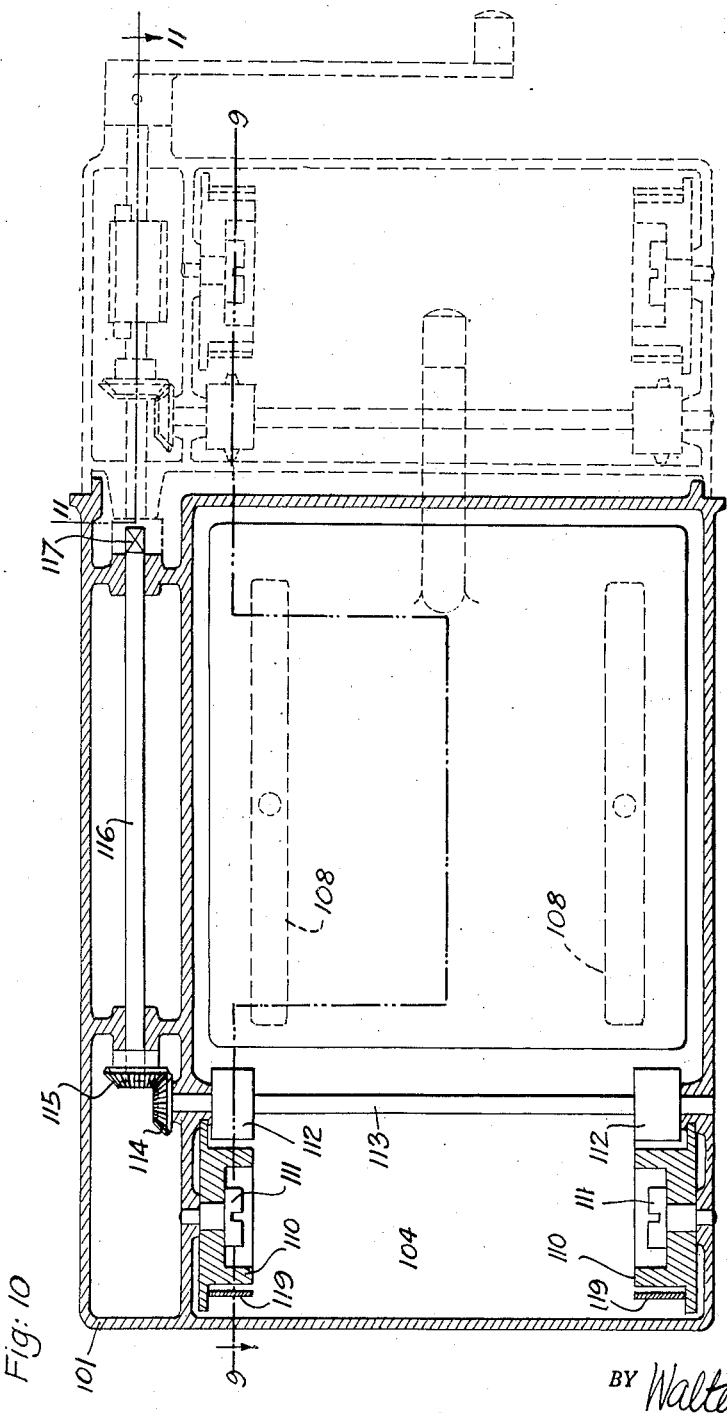

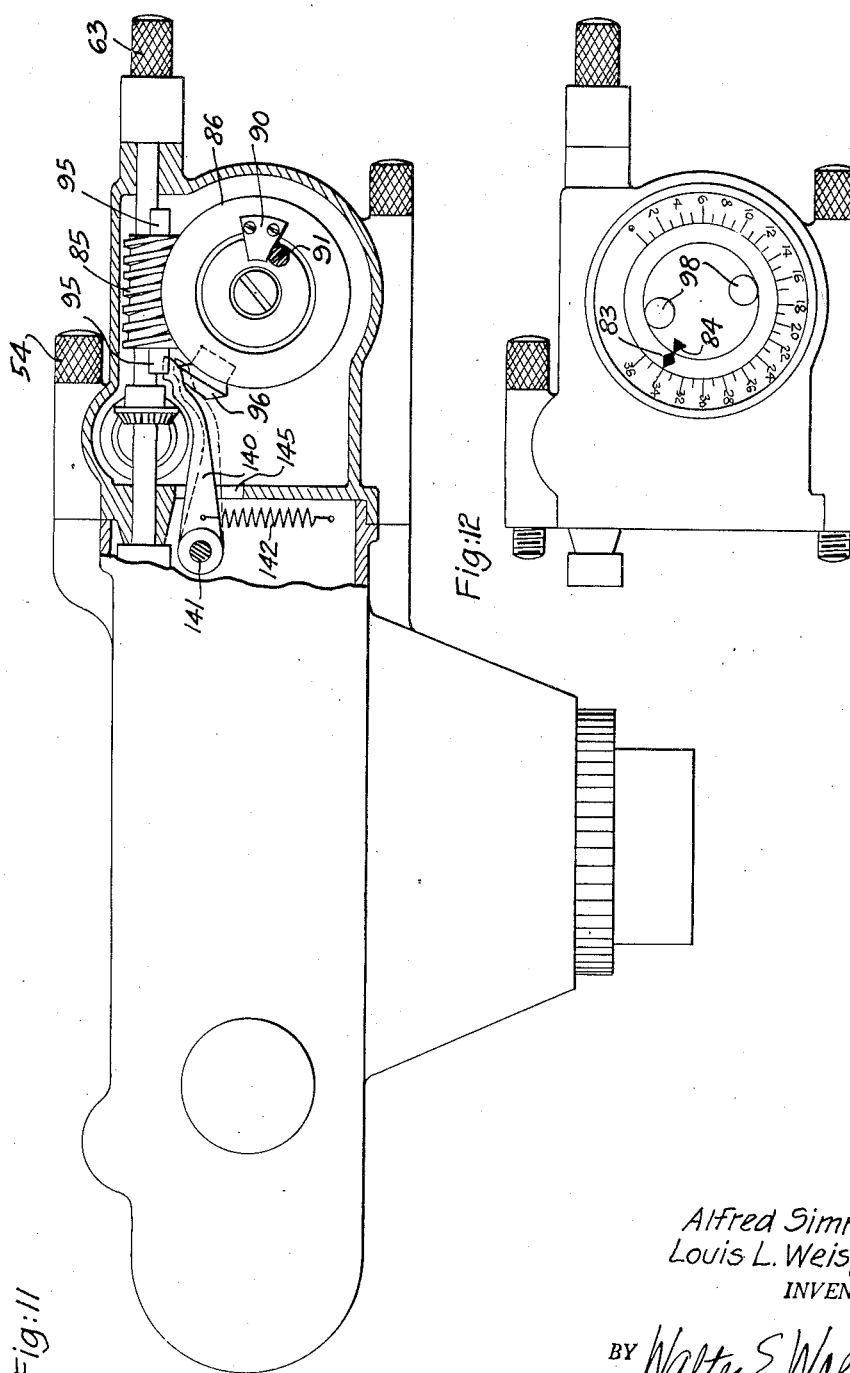

Patented May 3, 1949

2,469,008

UNITED STATES PATENT OFFICE 2,469,008

ROLL FILM CAMERA WITH DETACHABLE MAGAZINE

Alfred Simmon, Jackson Heights, and Louis L. Weisglass, New York, N. Y., assignors to Simmon Brothers, Inc., Long Island City, N. Y., a corporation of New York Application September 28, 1944, Serial No. 556,104

1 Claim. (Cl. 95—31)

This invention pertains to the design of a "still" camera, as distinguished from a motion picture camera, with a detachable film magazine. To better understand the object and advantages of this invention a brief description of the state of the art is presented herewith.

A camera comprises a housing which supports the lens, the shutter and the various other elements of a camera. In the case of a roll film camera, this housing has two cavities or pockets, usually one on either side of the focal plane, which accept a loaded and an empty or take-up film spool, respectively, and between exposures the film is transferred step by step from the loaded to the take-up spool.

Since it becomes frequently desirable to change from one type of film to some other type, for example, from ordinary film to color film, before the entire film supply in the camera is exhausted, detachable film magazines have been designed. They consist essentially of the aforementioned two pockets which are connected by a suitable channel and which now form a separate detachable unit. A magazine of this general type is, for example, shown in #920,901. The necessarily large bulk of these magazines is the reason for their relatively infrequent use.

In modern cameras, automatic means are provided to advance the film and tension the shutter simultaneously, for example, by turning a crank or the like. The film advancing means tend to become unduly complicated since, during operation, the diameter of the take-up spool increases, which must be compensated for by some means, usually by automatically decreasing the number of revolutions between exposures.

As a means of simplification, perforated film was introduced some years ago, which can be advanced by a toothed sprocket which between exposures always performs the same number of revolutions.

Cameras using perforated film are of two general types:

In the first type, the film is inserted in one pocket, transferred during operation step by step into the other pocket, and finally, after the entire film has been exposed, removed from the second pocket.

In the second type, the film is only temporarily stored in the second pocket, and is rewound after its exposure into the first pocket and eventually removed therefrom.

In either case, driving means must be provided for the take-up spool, in the second pocket; but this take-up spool, due to its steadily increasing diameter, cannot be directly geared to the aforementioned film-advancing sprocket, and the use of a slip clutch or the like becomes necessary.

To avoid this added complication, spool-less film receiving or film storage pockets have been designed, in which the film was guided only by a single spiral-shaped leaf spring. They have not been very successful, since these spiral springs do not guide the film properly, introduce a large amount of friction, and accept only relatively short lengths of film. A spool-less film storage pocket of this general type is, for example, shown in Patent #2,336,278.

Perforated film is sometimes supplied in so-called "cartridges," which are small, substantially cylindrical, containers for the loaded film spool. During operation, the cartridge rests in the "first pocket" of the camera housing, i. e. really a housing within a housing, and the film is first, between exposures, wound into the second pocket and stored there temporarily, and then rewound into the cartridge. This makes "daylight loading" possible, but attention must be called to the fact that, if partially exposed film is rewound into the cartridge, the unused portion cannot be used later, since the operator has no means of knowing where the exposed section ends and the unexposed section begins. A cartridge of this type is, for example, shown in Patent #2,019,672.

It is the purpose of our invention to provide an improved camera for perforated roll film equipped with a detachable magazine. This is achieved by a combination of the following means:

1. The first film pocket, which before the exposures is loaded with unexposed film and into which the exposed film is eventually rewound, is a detachable unit, namely the magazine proper. It is equipped with a crank driven film advancing sprocket and an exposure counter of novel design.

2. The film pocket in which the exposed film is temporarily stored, until it is rewound into the first pocket, is an integral part of the camera housing.

3. Both pockets are equipped with a novel arrangement of leaf springs which guide and confine the film without the aid of spools.

4. The camera body is equipped with auxiliary film driving means which cooperate with the film advancing sprocket built into the detachable magazine.

This arrangement has the following advantages:

a. The detachable magazine becomes quite small, since it comprises only one film pocket, and not two, as customary heretofore.

b. If the film is rewound into the detachable magazine after partial exposure, the unused portion may be exposed later, after a second insertion into the camera. This is made possible by the novel design of the exposure counter, which shows the operator how far the film has been exposed and where the unexposed part begins.

c. Due to the absence of spools, the film advancing and the film rewinding means become very simple, since driving means for the take-up spool and for the original spool, for rewinding, are no longer necessary.

d. The novel spool-less film supporting means, together with the built-in counter and crank driven film advancing sprocket, render it quite simple to load the magazine with unexposed film from a film storage container, as well as to transfer later the exposed film from the magazine into a developing tank. This can be done without going into a dark-room and without touching the film by hand.

A preferred embodiment of our invention is illustrated in the accompanying drawings in which Figs. 1 to 8 show the detachable film magazine. Fig. 1 shows a plan view, Fig. 2 a cross-sectional view along the plane of line 2—2, indicated in Fig. 7. Figs. 3 and 4 cross-sectional views along the plane of line 3—3 and 4—4, respectively, indicated in Fig. 2, Fig. 5 a cross-sectional view along the plane of line 5—5 in Fig. 7, Fig. 6 a cross-sectional view in plane of line 6—6 in Fig. 7, Fig. 7 a cross-sectional view along the plane of line 7—7 in Fig. 1, and Fig. 8 a cross-sectional view along the plane of line 8—8 in Fig. 1.

Figs. 9 and 10 show the camera to be used in conjunction with the detachable film magazine. Fig. 9 shows a cross-sectional view along the plane of line 9—9 in Fig. 10, and Fig. 10 shows a cross-sectional view along the plane of line 10—10 in Fig. 9.

Figs. 11 and 12 show the camera and the magazine as set for the last exposure.

DESCRIPTION OF MAGAZINE

Housing

The magazine comprises a housing which is preferably a die casting or molded Bakelite part, or made from sheet metal. This housing is shown in the drawings as 51. Although it is shown as of one piece construction, it will be understood that in actuality it may be suitably subdivided in order to permit convenient manufacture and assembly. The housing must, of course, be provided with means for attaching it to the main camera body. The means shown for this purpose consist of two screws 52 and 53, Fig. 6, which can be rotated by knurled knobs 54. It is obvious, of course, that other means for attaching it to the camera housing can very well be used, such as a sliding arrangement or other methods well known in the art. A ridge 55 runs around the entire side of the magazine and engages a correspondingly formed ridge on the camera body so as to insure a light-tight connection. A slot 56 is provided by means of which the film can be inserted into the magazine. This slot is lined with strips 57 which are made from felt or velvet, or other suitable material. The purpose of these strips is to permit free passage of the film, but to prevent the entrance of light into the interior of the magazine. A soft, but slightly resilient material, such as felt, must be chosen so that the film will not be scratched during this process.

Sprocket drive

In order to move the film either in or out of the magazine, at least one, but preferably two sprockets 58 are provided. These sprockets are mounted on a shaft 59 and a bevel gear 60 is mounted on the upper end of the shaft. Bevel gear 60 meshes with another bevel gear 61 which is fastened to a shaft 62 which can be rotated by crank 63. The other end of shaft 62 terminates in a coupling element 64 which, in cross-section, has the configuration shown in Fig. 3. It is the purpose of this coupling element to engage a correspondingly formed end of another shaft which is mounted in the camera body and which forms an extension of shaft 62. The sprocket 58 is preferably designed in such a way that an even number of revolutions, such as one or two, is required in order to advance the film one frame. As shown, two revolutions are required. The perforated film is guided in its position opposite sprockets 58 by guide rollers 65. These are plain cylindrical rollers with a groove large enough to permit the free rotation of the teeth of the sprockets 58. In the drawings only one set of guide rollers 65 is shown, but it is sometimes advantageous to provide two sets, arranged in such a way that the film is guided in a more or less semicircular path around sprockets 58.

Film support

The film support is characterized by the absence of a film spool and it is, therefore, no longer necessary to laboriously thread the leading end of the film into a slotted spool or the like.

Figure 7:
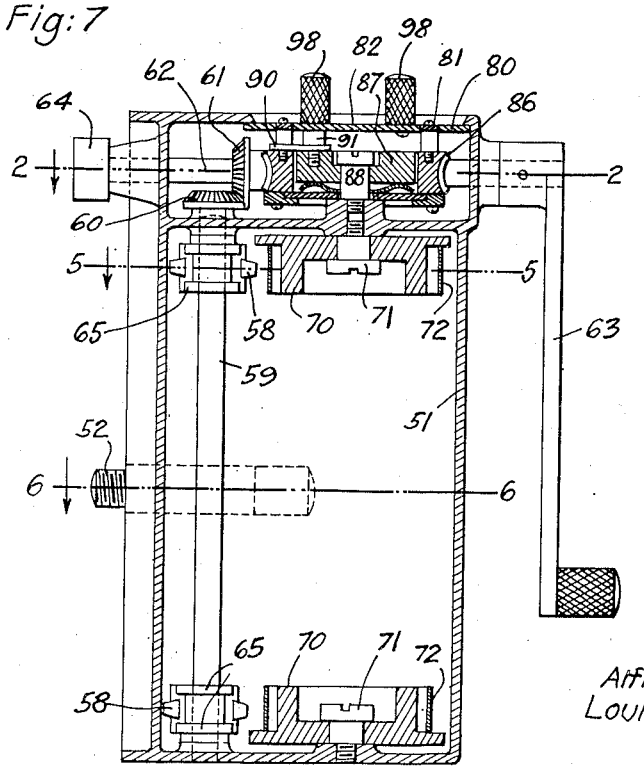

The means to support the film within the magazine comprise a cylindrical core, which may or may not be rotatable, and a set of springs which force the film to wind itself tightly around said core. It is not necessary that the core extend through the entire width of the film and two flange-like discs on either end will serve this purpose quite well. Such discs 70 are shown in Figs. 5 and 7, and others. These discs may rotate on pivots 71. This rotation is not strictly necessary, but a rotatable arrangement reduces friction. A set of leaf springs 72 is evenly spaced around the core 70 in the manner clearly shown in Fig. 5. While four springs have been shown, any other greater number may also be used should that appear advantageous. The width of the flanges 70 and of the leaf springs 72 is preferably chosen in such a way that they cover only the perforated margins of the film, but not that part of the film which is utilized for the actual picture. In this manner, any accidental damage, such as scratches which may occur during the winding process, will be of no consequence.

Exposure counter

The exposure counter is shown in Figs. 1, 2 and 7. It comprises a scale 80 which is stationarily fastened to the magazine housing, and a rotatable ring 81 and disc 82, respectively. These elements carry marks 83 and 84, respectively, the purpose of which will be explained later. Ring 81 is rotated between exposures by the rotary movement of crank 63 through the medium of a suitable gear reduction. The reduction must be designed in such a way that ring 81 performs slightly less than one full revolution during the exposure of the entire film strip with which the magazine has been loaded. This gear reduction may be of any convenient design and merely as a matter of illustration, we are showing a worm drive consisting of a worm 85 which drives the worm gear 86.

The disc 82 which carries mark 84 is fastened to a rotatable cylindrical body 87 by means of a stud 91. This part rotates on a pivot 88, and it is necessary to provide a certain amount of friction so that the cylindrical part 87 will not accidentally change its position. This can be done in a number of ways, for example, by means of a spring washer 89 as shown in Fig. 7. A ratchet arrangement would also serve this purpose. Two knurled knobs 90 are attached to disc 82, enabling the operator to reset it manually, since this may become necessary under certain conditions. As can be seen in Fig. 2, a part 90, which is merely a flat sheet metal stamping, is fastened to worm gear 86 and rotates with it. As long as worm gear rotates in a clockwise direction it will, therefore, push stud 91 and therewith cylindrical part 87 and disc 82 with its mark 84. If, however, worm gear 86 is rotated in a counter clockwise direction, stud 91 with the associated parts enumerated above will not follow, but will remain stationary in its last position.

The purpose of this arrangement will become clear later when we describe the operation of the device. It enables the operator to know which part of the film has been exposed and which part of the film is as yet unexposed.

In order to make the device more nearly foolproof, it is desirable to provide two stops, so that the counter cannot be set below the zero mark or above the highest exposure number, in this case 36. These stops could conceivably be two pins or the like put into the path of some suitable projection fastened to worm gear 86. However, since the gear reduction is very appreciable, usually of the general order of 1:40 or 1:50, the operator can exert an extraordinary momentum, and these pins are, therefore, very liable to be broken accidentally. It is, therefore, preferable to provide some means to stop the motion of shaft 62 directly, because the torque exercised by the operator is then only 1/40 or 1/50 of the torque exercised through worm gear 86. For this reason, the worm gear 86 is equipped with projections 95 which are also shown in cross-section in Fig. 4. A protruding piece 96 is fastened to worm gear 86 and, in the two extreme positions, the protruding piece 96 will be in the rotary path of one of the projections 95 of the worm, either on one side or the other. The rotary motion of shaft 62 can, therefore, be stopped with certainty in either of the extreme positions, and the parts comprising this mechanism have to be merely strong enough to accept the simple torque exerted by the operator on crank 63 instead of 40 or 50 times that torque as otherwise necessary.

The cavity of the magazine housing containing the worm gear assembly has an opening 145, Fig. 2; permitting the entrance of a lever 149 mounted on the camera. The purpose of this lever will be explained later. It can be seen in Fig. 11.

DESCRIPTION OF CAMERA

*Housing*

A camera cooperating with a detachable magazine, as described, is shown more or less schematically in Figs. 9 and 10. It comprises a housing 101 to which all other parts are fastened. It will again be understood that although this housing is shown to be of a one piece construction it will, in reality, be suitably subdivided for convenient manufacture and assembly. It will also be understood that the numerous component parts which are necessary for a really complete camera are shown only in a greatly simplified manner. We have, for example, shown the outline of a lens 102, but have not shown in great detail the focusing mount. We have also shown schematically two rollers 103 for a focal plane shutter without going into detail. Other parts such as a range finder have been omitted since they do not form part of this invention.

The housing comprises a film storage pocket 104 which will be described in detail later, the auxiliary film drive, which will also be described later, a film gate 105, and a pressure plate 106 by means of which the film is held accurately in the focal plane, and a suitably machined side 107 to which the aforementioned detachable film magazine can be attached. In Figs. 9 and 10 the magazine is shown in dotted lines.

The entire housing of the camera with the exception of the detachable film magazine is of reasonably conventional construction and has no particularly outstanding features except for the detailed design of the film storage pocket 104 and the auxiliary film advancement drive. The pressure plate 106 is shown to be supported by two leaf springs 108, but this is merely by way of example and other means to press the pressure plate against the film gate 105 can be conceivably used, or may even be preferable. Particularly, a cam operated device may have certain advantages, since then means can be provided to exert pressure on the film only during the exposure; or at any rate, after the film advancing movement has been finished, and during the film advancement itself the pressure plate can be retracted. This will reduce friction and possible damage to the film.

*Film storage pocket*

The film storage pocket comprises a substantially cylindrical housing which is an integral part of the main camera housing 101. Film confining means are arranged within this cylindrical part of the camera housing. These film confining means are very similar or identical to the film confining means used within the detachable film magazine described above. They comprise two cylindrical cores 110 which are preferably rotatable and, in this case, pivots 111 are provided for this purpose. A set of leaf springs 119 force the film, which is fed into this storage pocket, to wind themselves rather tightly around the two cores 110.

*Film drive*

The two rotatable sprockets mounted within the detachable film magazine are capable of pushing the perforated film into the channel formed by the film gate 105 and the pressure plate 106. It is usually even possible to push the film in this manner from the film magazine through the aforementioned channel right into the film storage pocket 104. However, it has been found advantageous to provide auxiliary means to propel the film in this manner in order to reduce the free lengths over which the film, by its own stiffness, has to sustain the forward motion. At first glance, it would appear most logical to provide another set of sprockets exactly identical with sprockets 58 immediately in front of the entrance into the film storage pocket 104 and to connect this second set of sprocket gears to the first one by suitable mechanical means such as a chain drive or a transverse shaft and two sets of bevel gears. In practice, a device of this character will be extremely harmful to the film perforation and will invariably damage the film severly. This is due to the fact that the spacing of the perforated holes changes slightly due to film shrinkage, and while this shrinkage rarely amounts to more than 1 or 2% of the original film length, it is enough to make any accurate meshing of the perforated holes with more than one set of sprockets quite impossible. The same problem is encountered in motion picture projectors, but there the film forms a large loop so that any discrepancies can be taken up. Obviously, this expedient is inappropriate in this case.

This difficulty can be overcome by designing the auxiliary film drive within the camera as a friction drive. The rollers used for this purpose can be seen in Fig. 9. We are using two relatively large rollers 112, approximately as large as the sprockets 58 which are opposed by smaller rollers 118. The film, as will be explained later, passes between the two sets. It is desirable to provide a suitable resilient mounting for one of these shafts in order to insure sufficient friction. It is also best to have those rollers made from some relatively soft material such as Bakelite. The rollers 112 are mounted on a shaft 113 which, by means of two bevel gears 114 and 115, is driven by a transverse shaft 116. This transverse shaft has an end piece of square configuration 117 which fits into the correspondingly formed socket of the coupling element 64 of the detachable film magazine. As can be clearly seen in Fig. 10, the movement of the crank which causes rotation of the two sprockets 58 within the film magazine also causes a corresponding rotation of friction rollers 112 within the camera. The diameter of friction rollers 112 should be slightly larger than the diameter obtained by theoretical computation because then the film will be under a certain amount of tension which is advantageous in order to keep it flat.

It is a well known expedient in cameras of this type to connect the film advancing with the shutter tensioning movement. In this camera, this can easily be done by mounting suitable gears on shaft 116 and connecting them to one of the rollers of the focal plane shutters 103. This is not shown in our drawings since expedients of this type are well known.

OPERATION

Exposures

Before the magazine is attached to the camera by means of the two knurled screws 54, the short end of film protruding through slot 56 is inserted into a corresponding slot in the camera housing. The operator now rotates crank 63 in a forward direction, causing sprocket 58 to rotate, thereby propelling the film into the channel formed by pressure plate 106 and film gate 105. Eventually, the film is engaged by the two friction rollers 112 and 118 and with their aid, pushed into the film storage pocket 104. The co-action of the film, the cylindrical body 110 and the set of leaf springs 119 is identical to the action of the corresponding elements in the film magazine itself, i. e., the film is wrapped around the cylindrical body 110, and subsequent convolutions will be wrapped around the first convolution. Between exposures, the worm gear 86 rotates, and part 96 assumes a new position completely out of contact with either of the two projections 95. At the same time, stamping 98 pushes stud 91 into a new position, thereby causing mark 84 to remain in register with mark 83. Both marks point now to a certain dial marking on the exposure dial, thereby indicating the number of the exposure for which the camera is ready or the number of exposures which have already been taken.

Removal of magazine after partial exposure of the film

If we assume that at this stage the operator desires to exchange the film used in the camera for some other type of film, for example, color film, he must first wind the entire film back into the magazine. This is simply done by rotating crank 63 backwards. Should there be any connection between the film winding means and the shutter setting means, these must, of course, be disconnected. Means to this end are well known in the art and are, therefore, not shown here. After the film has been rewound, mark 83 has returned to its original position and is again opposite the "zero" mark of the dial. Mark 84, however, has remained stationary and still points to the last dial marking before the film was rewound. This is caused by the fact that stamping 98 in its counter-clockwise movement during the rewinding process gets out of contact with stud 91. Stud 91 is fastened to the cylindrical body 87 which, as explained above, is held stationary by friction provided for this purpose, see Fig. 7.

After the film has been rewound in this manner, the magazine can be detached from the camera by loosening the knurled knobs 54, and a new magazine loaded with another kind of film can be substituted.

Reinsertion of partially exposed film

There are cases where an appreciable portion of the film remains as yet unexposed when the film was rewound. Should this occur in the conventional film cartridge, now commercially available, this portion is wasted because, while it may be theoretically possible to reinsert such a partially exposed cartridge into the camera, the operator has no means of knowing how far he is to wind the film into the camera before the film presents the first, as yet unexposed, frame to the lens. In the absence of a suitable counting device associated with the cartridge, such a procedure would not only be cumbersome and inconvenient, but extremely dangerous, since double exposures may spoil valuable negatives previously taken.

With a device built according to our invention, partially exposed film can be reinserted into the camera quickly, conveniently and with accuracy so that there is no danger of double exposures. It is merely necessary to attach the magazine to the camera again and rotate crank 63 in the forward direction, whereupon mark 83 will begin to travel in a clockwise direction. This rotation is continued until marks 83 and 84 are in register again, i. e., until the appearance of the dial markings has been changed back to the last position before rewinding. The operator now knows with certainty that all the previously exposed part of the film has been transferred from the magazine to the film storage pocket 104 of the housing, and that the first unexposed frame is now in the focal plane of the camera. Further exposures can then be made in the usual manner.

*Last exposure*

For the last exposure, a problem arises, due to the fact that the counting device, as shown in Fig. 2, is equipped with automatic stops which prevent further rotation of the film advancing means in one direction when the magazine is entirely empty. In other words, the automatic stop will prevent rotation of crank 63 and sprocket 58 only after the magazine has become entirely empty or after the film has lost contact with the sprockets 58. Obviously, it can then no longer be rewound into the magazine by rotating crank 63 backwards. In order to overcome this difficulty, we have provided auxiliary means mounted on the camera housing to prevent the rotation of the film advancing means in the forward direction slightly before the magazine becomes entirely empty. These means will, of course, be effective only when the magazine is attached to the housing. It will not affect the ready removal of the film from the magazine when the magazine is detached from the camera housing.

This auxiliary automatic stop for the film advancing means is shown in Fig. 11, and the appearance of the exposure counting dial at this time is shown in Fig. 12. Almost the entire film is now stored in pocket 104 which forms part of the camera housing. A short end of film, however, still remains in the film magazine and, most important, the sprocket 58 is still securely in mesh with some of the perforation holes of the film.

Fig. 11 shows the camera partly in cross-section along the plane of line 11—11 in Fig. 10. A lever 140 is mounted on the camera housing. This lever is supported rotatably by a pivot 141, biased by a spring 142 and assumes ordinarily the position shown in dotted lines.

The housing of the detachable film magazine has a slot 145, which permits the end of lever 140 to reach into the interior of the cavity of the magazine which contains the worm gear assembly of the exposure counter.

Lever 140 does not ordinarily, i. e. in the position shown in dotted lines, interfere with the rotary movement of the worm gear 85, and particularly it is out of the path of the projecting piece 95 mounted on the left side of said worm. Worm gear 86 rotates between exposures in a clockwise direction carrying with it the protruding piece 96. Eventually, this protruding piece 96 comes in contact with the extreme end of lever 140 moving it from the position shown in dotted lines into the position shown in solid lines. In this position, lever 140 is in the rotary path of the left projecting part 95 associated with worm 85 and thereby prevents its further rotation. The rotation of worm gear 86 is now stopped somewhat earlier than when the magazine was unattached, or more specifically, when the magazine is not attached to the camera, the marks 83 and 84 will point in the extreme position at the dial line 36, but when the magazine is attached to the camera, it will not be possible to move them that far, but they will come to a stop earlier, for example, at dial line 34, as shown in Fig. 12. Therefore, as long as the magazine is attached to the camera, it becomes automatically impossible for the operator to wind the film accidentally too far out of the magazine and to disengage the film entirely from the film driving sprocket wheels 58, and the film can always be rewound into the magazine.

While this description fully discloses the construction and operation of a camera with a detachable roll film magazine according to the principles of our invention, the same is of course, susceptible to many modifications. For example, while we have consistently described one film storage pocket as being an integral part of the housing and only the second film storage pocket to be detachable, it is perfectly conceivable to make both pockets individually detachable. It has already been suggested by others to incorporate a knife within a camera in order to cut the exposed portions of the film off the unexposed portions. Such a knife could be used in connection with two detachable pockets, thereby avoiding the necessity of rewinding the film into the original pocket before exchanging films. It would also be possible to use the device for unperforated film instead of for perforated film as shown. In this case, the sprockets 58 could be replaced by plain friction rollers without teeth. While such a design will not be as accurate as the one shown, it may, under certain circumstances, be satisfactory.

Other modifications will readily occur to anybody skilled in the art, and modifications of this character shall be considered to fall within the scope of this invention as defined in the appended claim.

What we claim as new is:

In a camera with a detachable roll film magazine, film advancing means, exposure counting means, automatic means to stop the movement of said film advancing means after a predetermined length of film has been advanced, all supported within the magazine, and means to modify said automatic means supported within the camera itself; said film advancing means comprising a first relatively fast rotating shaft; said exposure counting means comprising a train of gears driven by said first shaft, and a second relatively slowly rotating shaft driven by said train of gears; said automatic means to stop the movement of said film advancing means comprising a first and a second projection carried by said first shaft, a first movable obstruction and means actuated by said second shaft to move said first obstruction into the path of the first of said projections after a predetermined length of film has been advanced in a first direction in which the film is wound into the magazine, and to move said obstruction into the path of the second projection, after a predetermined length of film has been advanced in a second direction in which the film is wound out of the magazine; said means to modify said automatic means comprising a second movable obstruction supported within the camera and adapted to be placed automatically between the second of said projections and said first obstruction, when said magazine is attached to said camera; whereby, when said magazine is detached from said camera, the movement of said film advancing means is stopped by the coaction of the first projection with said first obstruction after a predetermined length of film has been advanced in the first direction, the magazine then being fully loaded, and by the coaction of the second projection with said first obstruction after the same length of film has been advanced in the second direction, the magazine then being entirely empty and whereby, when said magazine is attached to said camera, the movement of said film advancing means is again stopped by said coaction of the first projection and said first obstruction after the same predetermined length of film has been advanced in the first direction, the magazine then again being fully loaded, and by the coaction of the second projection and said second obstruction after another, but shorter, predetermined length of film has been advanced in the second direction, the magazine then still containing a short length of film, said first obstruction pushing said second obstruction into the path of said second projection.

ALFRED SIMMON.
LOUIS L. WEISGLASS.

REFERENCES CITED

The following references are of record in the file of this patent:

UNITED STATES PATENTS

| Number | Name | Date |
| --- | --- | --- |
| 525,786 | Lewis | Sept. 11, 1894 |
| 920,901 | Bander | May 11, 1909 |
| 1,036,385 | Vale | Aug. 20, 1912 |
| 1,232,125 | Trippel | July 3, 1917 |
| 1,250,792 | Burdette | Dec. 18, 1917 |
| 1,532,544 | Newman | Apr. 7, 1925 |
| 1,804,680 | Fairchild | May 12, 1931 |
| 1,806,308 | Paul | May 19, 1931 |
| 1,832,656 | Powers | Nov. 17, 1931 |
| 1,947,482 | Mihalyi | Feb. 20, 1934 |
| 1,984,078 | Nagel | Dec. 11, 1934 |
| 2,012,334 | Barenyi | Aug. 27, 1935 |
| 2,040,018 | Kilfitt | May 5, 1936 |
| 2,093,480 | Platt | Sept. 21, 1937 |
| 2,095,849 | Wittel | Oct. 12, 1937 |
| 2,150,106 | Roessel | Mar. 7, 1939 |
| 2,150,693 | Mihalyi | Mar. 14, 1939 |
| 2,150,696 | Nelson | Mar. 14, 1939 |
| 2,180,064 | Nuchterlein | Nov. 14, 1939 |
| 2,187,547 | Pollock | Jan. 16, 1940 |
| 2,225,433 | Goldberg | Dec. 17, 1940 |
| 2,237,737 | Houston | Apr. 8, 1941 |
| 2,298,574 | Lockhart | Oct. 13, 1942 |
| 2,336,278 | Mihalyi | Dec. 7, 1943 |
| 2,340,624 | Simmon | Feb. 1, 1944 |

FOREIGN PATENTS

| Number | Country | Date |
| --- | --- | --- |
| 558,914 | Germany | Sept. 13, 1931 |
| 629,025 | Germany | Apr. 21, 1936 |
| 661,826 | Germany | June 28, 1938 |